(12) United States Patent
Ward et al.

(10) Patent No.: US 7,710,899 B1
(45) Date of Patent: May 4, 2010

(54) SYSTEM AND METHOD FOR SPEEDING BORDER GATEWAY PROTOCOL GRACEFUL RESTART

(75) Inventors: David D. Ward, Somerset, WI (US); John Galen Scudder, Ann Arbor, MI (US); Pranav Mehta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1296 days.

(21) Appl. No.: 11/205,977

(22) Filed: Aug. 16, 2005

(51) Int. Cl.
*H04L 12/28* (2006.01)
(52) U.S. Cl. .................................................... 370/254
(58) Field of Classification Search ................. 370/216, 370/351, 396, 395.2, 395.31, 219, 401, 389, 370/254, 238
See application file for complete search history.

(56) References Cited

U.S. PATENT DOCUMENTS

| | | | |
|---|---|---|---|
| 5,088,032 A | 2/1992 | Bosack | |
| 5,519,704 A | 5/1996 | Farinacci et al. | |
| 5,617,421 A | 4/1997 | Chin et al. | |
| 5,917,820 A | 6/1999 | Rekhter | |
| 6,269,099 B1 * | 7/2001 | Borella et al. ............... | 370/389 |
| 6,339,595 B1 | 1/2002 | Rekhter et al. | |
| 6,370,119 B1 | 4/2002 | Basso et al. | |
| 6,400,681 B1 | 6/2002 | Bertin et al. | |
| 6,463,061 B1 | 10/2002 | Rekhter et al. | |
| 6,526,056 B1 | 2/2003 | Rekhter et al. | |
| 6,539,427 B1 | 3/2003 | Natarajan et al. | |
| 6,553,423 B1 | 4/2003 | Chen | |
| 6,577,597 B1 | 6/2003 | Natarajan et al. | |
| 6,584,093 B1 | 6/2003 | Salama et al. | |
| 6,584,502 B1 | 6/2003 | Natarajan et al. | |
| 6,658,595 B1 * | 12/2003 | Thamattoor ................... | 714/11 |
| 6,718,376 B1 | 4/2004 | Chu et al. | |
| 6,751,188 B1 * | 6/2004 | Medved et al. ............... | 370/216 |
| 7,023,808 B2 * | 4/2006 | Ball et al. .................... | 370/238 |
| 7,286,468 B2 * | 10/2007 | Scudder et al. .............. | 370/219 |
| 7,318,108 B2 * | 1/2008 | Sreekantiah et al. ........ | 709/242 |

(Continued)

OTHER PUBLICATIONS

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

(Continued)

*Primary Examiner*—Derrick W Ferris
*Assistant Examiner*—Stephen W Brown
(74) *Attorney, Agent, or Firm*—Cesari and McKenna, LLP

(57) ABSTRACT

A technique is provided for graceful restart of a Border Gateway Protocol (BGP) router that uses a local store on the restarting router that stores prefixes on all routes or the "group best path" information on all BGP peers having a common Autonomous System (AS) number. This local store is used to run best path computations on the restarting router, rather than first awaiting receipt of route information from peers to speed the restart process. Updates are then transmitted to peers using the best path data and an end-of-Routing Information Base (RIB) message it transmitted by the restarting router to indicate that all information has now been sent by the restarting router. Thereafter the restarting router processes incoming updates from peers as received (or these peers routes are timed-out), remaining stale paths are deleted and any changed best paths, based upon the newly received updates, are then transmitted to peers.

21 Claims, 6 Drawing Sheets

U.S. PATENT DOCUMENTS

| | | | |
|---|---|---|---|
| 7,359,377 B1 * | 4/2008 | Kompella et al. | 370/389 |
| 2002/0021675 A1 * | 2/2002 | Feldmann | 370/254 |
| 2003/0174653 A1 | 9/2003 | Basu et al. | |
| 2004/0090913 A1 * | 5/2004 | Scudder et al. | 370/219 |
| 2005/0074001 A1 | 4/2005 | Mattes et al. | |
| 2005/0074003 A1 * | 4/2005 | Ball et al. | 370/389 |
| 2005/0135256 A1 * | 6/2005 | Ball et al. | 370/238 |
| 2006/0171404 A1 * | 8/2006 | Nalawade et al. | 370/401 |
| 2006/0291446 A1 * | 12/2006 | Caldwell et al. | 370/351 |

OTHER PUBLICATIONS

R. Pearlman, "Interconnections, Bridges and Routers", Addison Wesley Publishing Company, Reading, Massachusetts, pp. 323-329 (1992).

Rekhter et al, <draft-ietf-idr-bgp4-20.txt> "A Border Gateway Protocol 4 (BGP-4)", Internet Engineering Task Force, Apr. 2003 pp. 1-85.

Rekhter et al., "A Border Gateway Protocol 4 (BGP-4)" Request For Comments (RFC) 1771, Internet Engineering Task Force, http://www.ietf.org, Mar. 1995, pp. 1-57.

http://www.cisco.com/un d/cc/t...s120/12cgcr/np1_c/1cprt1/1cbgp.htm, "Configuring BGP" Copyright 1989-1999 pp. 1-44.

http://www.ietf.org/internet-drafts/draft-ietf-idr-bgp4-cap-neg-03.txt, "Capabilities Negotiation with BGP-4", posted Mar. 10, 1999, pp. 1-4.

Tony Bates, et al., World Wide Web page http://www.search.ietf.org/internet-drafts/draft-ietf-idr-bgp4-multiprotocol-v2-02.txt, "Multiprotocol Extensions for BGP-4", posted Apr. 2, 1999, pp. 1-10.

Rekhter et al, <draft-ietf-idr-bgp4-23.txt> "A Border Gateway Protocol 4 (BGP-4)", Internet Engineering Task Force, Nov. 2003 pp. 1-98.

T. Bates et al., "Multiprotocol Extensions for BGP-4" Request for Comments (RFC) 2858, Internet Engineering Task Force, http://www.ietf.org/, Jun. 2000 pp. 1-11.

R. Chandra et al., "Capabilities Advertisement with BGP-4" RFC 3392, Internet Enginerring Tast Force, http://www.ietf.org/, Nov. 2002, pp. 1-6.

G. Nalawade et al., <draft-nalawade-bgp-soft-notify-00.txt> "BGPv4 Soft-Notification Message", Internet Engineering Task Force, http://www.ietf.org/, Oct. 2003, pp. 1-9.

Reynolds et al., "Assigned Numbers" Request for Comments (RFC) 1700, Internet Engineering Task Force, http://www.ietf.org/, Oct. 1994, pp. 1-215.

"Address Family Numbers", http://www.iana.org/, last updated May 14, 2002.

"SAFI-Subsequence Address Family Identifier per [RFC2858]", http://www.iana.org/, last updated Feb. 12, 2004.

Ball et al., "United States Patent Application for a Distributed Software Architecture for Implementing BGP" U.S. Appl. No. 10/677,797 filed on Oct. 2, 2003.

Bird et al., "United States Patent Application for a System and Method for Local Packet Transport Services Within Distributed Routers" U.S. Appl. No. 10/293,180 filed on Nov. 12, 2002.

Scudder at al., "United States Patent Application for a Technique for Graceful Shutdown of a Routing Protocol in a Network" U.S. Appl. No. 10/775,877 filed on Feb. 10, 2004.

Ball et al., "United States Patent Application for a System and Method for Distributing Route Selection in an Implement of a Routing Protocol" U.S. Appl. No. 10/743,973 filed on Dec. 23, 2003.

Nalawade et al., "United States Patent Application for a Soft Notification Messaging for a Routing Protocol" U.S. Appl. No. 10/833,811 filed on Apr. 28, 2004.

Sangli et al., "Graceful Restart Mechanism for BGP <draft-ietf-idr-restart-10.txt>", Internet Draft Jun. 2004 with an Expiration Date of Dec. 2004.

* cited by examiner

SYSTEM AND METHOD FOR SPEEDING BORDER GATEWAY PROTOCOL GRACEFUL RESTART

BACKGROUND OF THE INVENTION

1. Field of the Invention

The invention relates generally to routing protocols used in computer networks and, more particularly, to a technique that speeds up graceful restart of a routing protocol executing on an intermediate node in a computer network.

2. Background Information

A computer network is a geographically distributed collection of interconnected communication links used to transport data between nodes, such as computers. Many types of computer networks are available, with the types ranging from local area networks to wide area networks. The nodes typically communicate by exchanging discrete packets or messages of data according to pre-defined protocols. In this context, a protocol consists of a set of rules defining how the nodes interact with each other.

Computer networks may be further interconnected by an intermediate node, such as a switch or router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers. Yet it still may be desirable to increase the number of nodes capable of exchanging data; in this case, intradomain routers executing interdomain routing protocols are used to interconnect nodes of the various autonomous systems (ASs).

An example of an interdomain routing protocol is the Border Gateway Protocol version 4 (BGP), which performs routing between autonomous systems by exchanging routing (reachability) information among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP establishes reliable connections/sessions using a reliable/sequenced transport protocol, such as the Transmission Control Protocol (TCP).

The reachability information exchanged by BGP peers typically includes destination address prefixes, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area of the network that a peer can reach. Each prefix may have a number of associated paths; each path is announced to a peer router by one or more of its peers. Note that the combination of a set of path attributes and a prefix is referred to as a "route"; the terms "route" and "path" may be used interchangeably herein. The BGP routing protocol standard is well known and described in detail in *Request For Comments (RFC) 1771*, by Y. Rekhter and T. Li (1995), *Internet Draft <draft-ietf-idr-bgp4-23.txt>* titled, *A Border Gateway Protocol 4 (BGP-4)* by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

The interdomain routers configured to execute an implementation of the BGP protocol, referred to herein as BGP routers, perform various routing functions, including transmitting and receiving routing messages and rendering routing decisions based on routing metrics. Each BGP router maintains a routing table that lists all feasible paths from that router to a particular network. The routing table is a database that contains routing information used to construct a forwarding table of a forwarding information base (FIB) that is used by the router when performing forwarding decisions on packets.

Periodic refreshing of the routing table is generally not performed; however, BGP peer routers residing in the as exchange routing information under certain circumstances. For example, when a BGP router initially connects to the network, the peer routers exchange the entire contents of their routing tables. Thereafter when changes occur to those contents, the routers exchange only those portions of their routing tables that change in order to update their BGP peers' tables. These update messages are thus incremental update messages sent in response to changes to the contents of the routing tables and announce only a best path to a particular network.

Broadly stated, a BGP router generates routing update messages for an adjacency, to also known as a peer router, by "walking-through" the routing table and applying appropriate routing policies. A routing policy is information that enables a BGP router to rank routes according to filtering and preference (i.e., the "best path"). Routing updates provided by the update messages allows BGP routers of the as to construct a consistent view of the network topology. The update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

Often, maintenance of routers (such as BGP routers) in a network is planned, thereby leading to shutdown or reset of a BGP process executing in the router. For example, a BGP router may be shutdown and removed from service in response to, e.g., upgrading of certain hardware or rebooting of the router following a software upgrade. In addition, the router may be reset in response to changing of BGP parameters, such as when a BGP router identifier is changed. However, a planned router shutdown or reset can result in temporary outages (i.e., loss of routing information exchange) for certain routes for which the shutdown router was the best path.

In order to implement a planned shutdown or reset of BGP, the shutdown router sends a conventional BGP Notification message with error code Cease in order to close its connections with its BGP peers. Subsequently to sending the Notification message, the shutdown router closes the TCP sessions over which the connections are established. In some implementations, the Notification message may be omitted. In response to closing the connections, all original routes advertised on those connections are immediately removed (withdrawn) from service (from the FIBs) by the BGP peers. As a result, some time (i.e., a convergence time) elapses before the network re-converges. In this context, the convergence time is the time that elapses between withdrawal of a route and the time when all subsequent messages triggered by the initial route withdrawal have been exchanged. In general, this can be characterized by the time needed for a BGP router to receive and process update messages from all of its peers, select best paths for each prefix, install those best paths into the routing table and advertise the best paths back to its peers.

However, in some networks, multiple such rounds of messages may be required or other factors may also play a part. This approach of simply "halting" the router and re-converging the network leads to temporary loss of routing information due to route withdrawal.

A BGP router may shutdown or become unavailable as result of a timeout or a failure condition. As such, a failed router's functions may be taken over by a designated failover (backup) router. In either a planned shutdown (above) or a sudden failure, eventually BGP connectivity within the failed router will be reestablished. The prior art defines a so-called "graceful restart" (GR) procedure that allows the BGP connection to be reestablished in a manner that causes the least disruption to other connections and avoids further timeouts. A more-detailed discussion of this procedure is provided in Internet Draft <draft-ietf-idr-restart-10.txt> titled, *Graceful Restart Mechanism for BGP* by S. Sangli, Y. Rekhter, et. al. (December 2004), the teachings of which are expressly incorporated herein by reference.

A graceful restart assumes that the restarting router's peers have first detected that the router's connection has shut down. Subsequently the peers detect that the shutdown router is coming back up and a graceful restart procedure is implemented in an attempt to limit the negative effects on routing caused by the restart of BGP. These negative effects result in part from the need to recompute BGP routes/paths. These processes consume significant system resources.

The conventional graceful restart approach outlined in the above-incorporated *Graceful Restart Mechanism for BGP* involves entry by the BGP peers into a read-only mode in which they send and receive updates of routes. The peers retrieve their local routing information and generate updates for the restarting router. The restarting router then receives route updates, and thereby updates its local FIB. Once updates are complete, any "stale" paths that are no longer employed by BGP are deleted and read only mode is exited. At this time, all other activity is completed and the "best path" procedure is run on the restarting router. Best path updates are then transmitted out to peers based upon the best path computation. Once updates are complete an end-of-RIB (routing information base) marker is sent out by peers to indicate that their updates are now complete. In this approach, the end-of-RIB marker is specified by an update message with no reachable network layer reachability information (NLRI) and empty withdrawn NLRI.

This procedure for graceful restart can be relatively slow to complete. In particular, it takes time to receive all BGP peers' routes and then to send out best paths to peers. A technique that reduces this latency is highly desirable.

An approach to preserving a BGP connection, with less latency used in so-called "high-availability" implementations of BGP architecture, is to store all state information related to the connection in a standby BGP process also termed a "stateful switchover" (SSO) that mirrors the primary BGP process. While this approach allows immediate reestablishment of the connection, and preserves the entire session, including TCP information, it is expensive both in terms of hardware and processing overhead.

SUMMARY OF THE INVENTION

This invention overcomes the disadvantages of the prior art by providing a system and method for speed up of graceful restart of a BGP router in a computer network. According to an aspect of the invention, a local store is employed on the restarting router that stores a redundant copy of all the prefixes that were received by all remote peers with notation of selection preference i.e. what was selected as "best-path." This local store is used to run best path computations on the restarting router, rather than first awaiting receipt of route information from peers to speed the restart process. The end-of-RIB message can then be immediately sent to all remote peers. Thereafter the restarting router processes incoming updates from peers as received (or these peers routes are timed-out), remaining stale paths are deleted and any changed best paths, based upon the newly received updates, are then transmitted to peers.

In one embodiment, the local store can be provided as a non-volatile memory within the primary board of the restarting router and/or on an interconnected standby board. By preserving the prefixes in a store that survives a restart, the end-of-RIB marker can be transmitted immediately by the restarting router, thereby preventing its apparent timeout by failing to respond in a timely manner.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
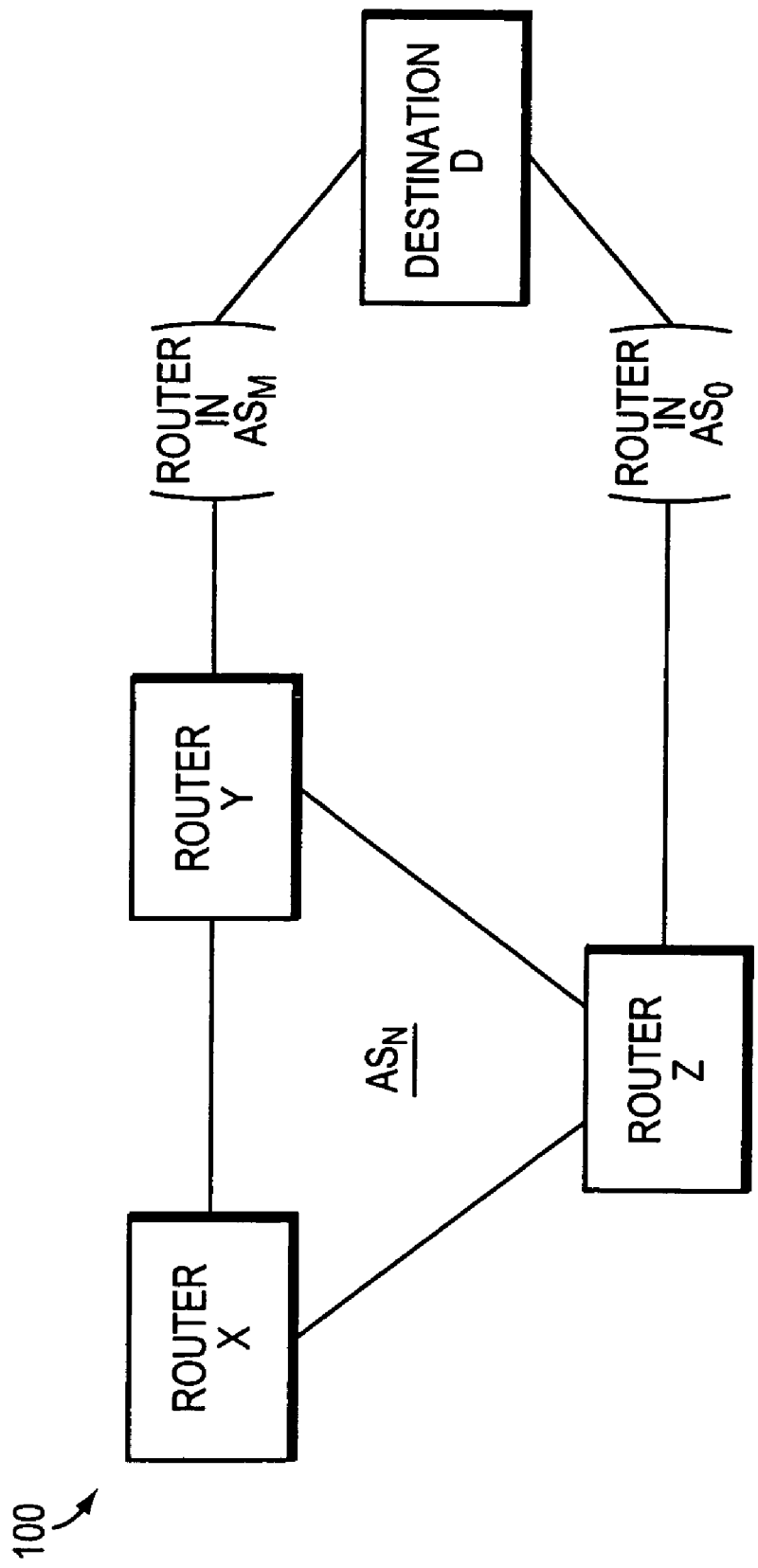
FIG. 1 is a schematic block diagram illustrating an arrangement of intermediate nodes, such as routers, within an autonomous system of a computer network 100.
Figure 2:
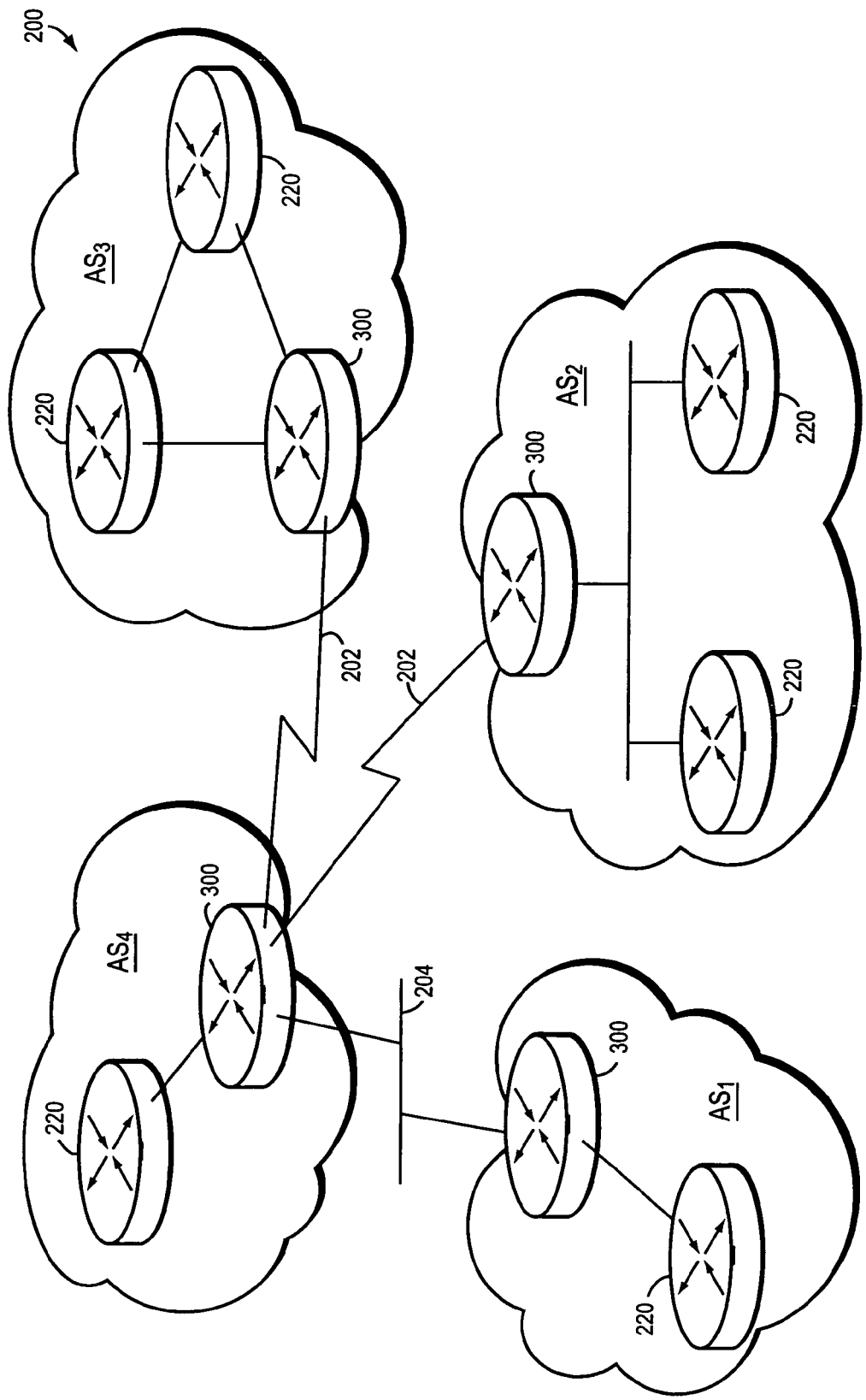
FIG. 2 is a schematic block diagram of a computer network comprising a plurality of routing domains interconnected by intermediate nodes, such as Border Gateway Protocol (BGP) interdomain routers.

FIG. 2 is a schematic block diagram of a computer network 200 comprising a plurality of routing domains interconnected by intermediate nodes. The intermediate nodes may comprise conventional switches but, in the illustrative embodiment, are conventional intradomain routers 220 and interdomain routers 300. The routing domains or autonomous systems ($AS_{1-4}$) are interconnected by the interdomain routers. The interdomain routers 300 are further interconnected by networks, such as local area networks 204, and point-to-point links 202, such as frame relay links, asynchronous transfer mode links or other serial links. Communication among the routers is typically effected by exchanging discrete data packets or messages in accordance with pre-defined protocols, such as the is Transmission Control Protocol/Internet Protocol (TCP/IP). It will be understood to those skilled in the art that other protocols, such as the Internet Packet Exchange (IPX) protocol, may be advantageously used with the present invention.

Figure 3:
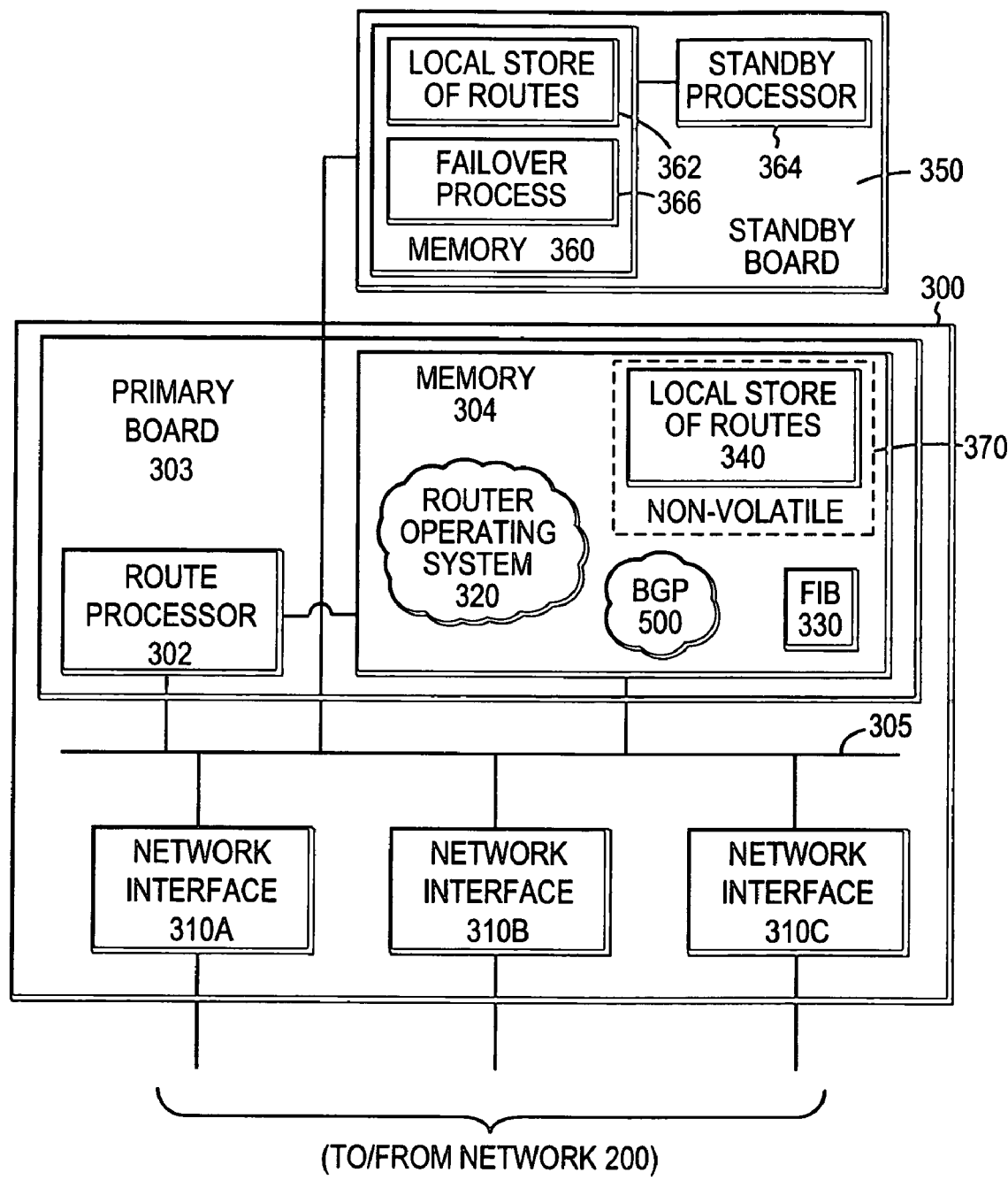
FIG. 3 is a schematic block diagram of an embodiment of an interdomain router that may be advantageously used with the present invention.

FIG. 3 is a schematic block diagram of an interdomain router 300 that may be advantageously used with the present invention. The interdomain router 300 comprises a route processor 302 coupled to a memory 304 (herein collectively termed the "primary board" 303) and a plurality of network interface adapters $310_{A-C}$ via a bus 305. The memory 304 may comprise storage locations addressable by the processor and interface adapters for storing software programs and data structures, such as a forwarding information base (FIB 330), that may be advantageously used with the inventive technique described herein. The route processor 302 may comprise processing elements or logic for executing the software programs and manipulating the data structures. An operating system 320, portions of which are typically resident in memory 304 and executed by the route processor 302, functionally organizes the router 300 by, inter alia, invoking network operations in support of software processes and routing protocol modules executing on the router. As described herein, one such routing protocol module is the Border Gateway Protocol version 4 (BGP 500). It will be apparent to those skilled in the art that other processor and memory means, including various computer readable media, may be used for storing and executing program instructions pertaining to the inventive technique described herein.

Figure 4:
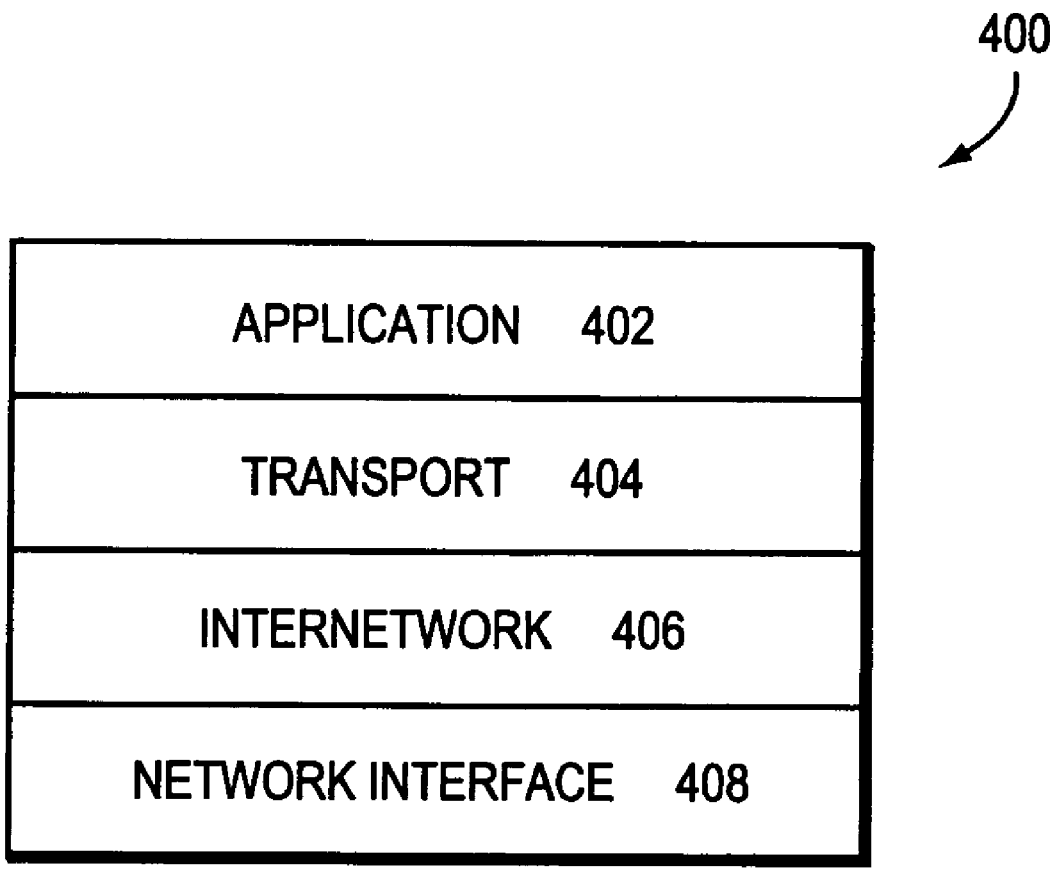
FIG. 4 is a schematic block diagram of a conventional protocol stack, such as the Internet communications protocol stack, within the interdomain router of FIG. 3.

A key function of the interdomain router 300 is determining the next router to which a packet is sent; in order to accomplish such "routing" the interdomain routers cooperate to determine best paths through the computer network 200. The routing function is preferably performed by an internetwork layer of a conventional protocol stack within each router. FIG. 4 is a schematic block diagram of a conventional network protocol stack, such as the Internet communications protocol stack 400. The architecture of the Internet protocol stack is represented by 4 layers termed, in ascending interfacing order, the network interface layer 408, the internetwork layer 406, the transport layer 404 and the application layer 402.

The lower network interface layer 408 is generally standardized and implemented in hardware and firmware, whereas the higher layers may be implemented in the form of software. The primary internetwork layer protocol of the Internet architecture is the IP protocol. IP is primarily a connectionless protocol that provides for internetwork routing, fragmentation and reassembly of exchanged packets—generally referred to as "data-grams" in an Internet environment—and which relies on transport protocols for end-to-end reliability and other service characteristics. An example of such a transport protocol is the TCP protocol, which is implemented by the transport layer 404 and provides connection-oriented, end-to-end reliability services to the upper layer protocols of the Internet architecture. The term TCP/IP is commonly used to denote the Internet architecture.

In particular, the internetwork layer 406 is concerned with how packets are forwarded through the network, although it is not directly concerned with how the FIBs are constructed. An interdomain routing protocol, such as BGP, is used to perform interdomain routing (for the internetwork layer) through the computer network. The interdomain routers 300 (hereinafter "peers") exchange routing and reachability information among the autonomous systems over a reliable transport layer connection, such as TCP. An adjacency is a relationship formed between selected peer routers for the purpose of exchanging routing messages and abstracting the network topology. The BGP protocol "runs" on top of the TCP transport layer 404 to ensure reliable communication of routing messages among the peer routers.

In order to perform routing operations in accordance with the BGP protocol, each interdomain router 300 maintains a routing table that lists all feasible paths from that router to each network. The routing table is a database that contains routing information used to construct a forwarding table of the FIB 330 by the route processor 302 when perm forming forwarding decisions on packets. The routers exchange the routing information using routing update messages when their routing tables change. The routing update messages are generated by an updating router to advertise best paths to each of its neighboring peer routers (peers) throughout the computer network. These routing updates allow the BGP routers of the autonomous systems to construct a consistent and up-to-date view of the network topology.

Figure 5:
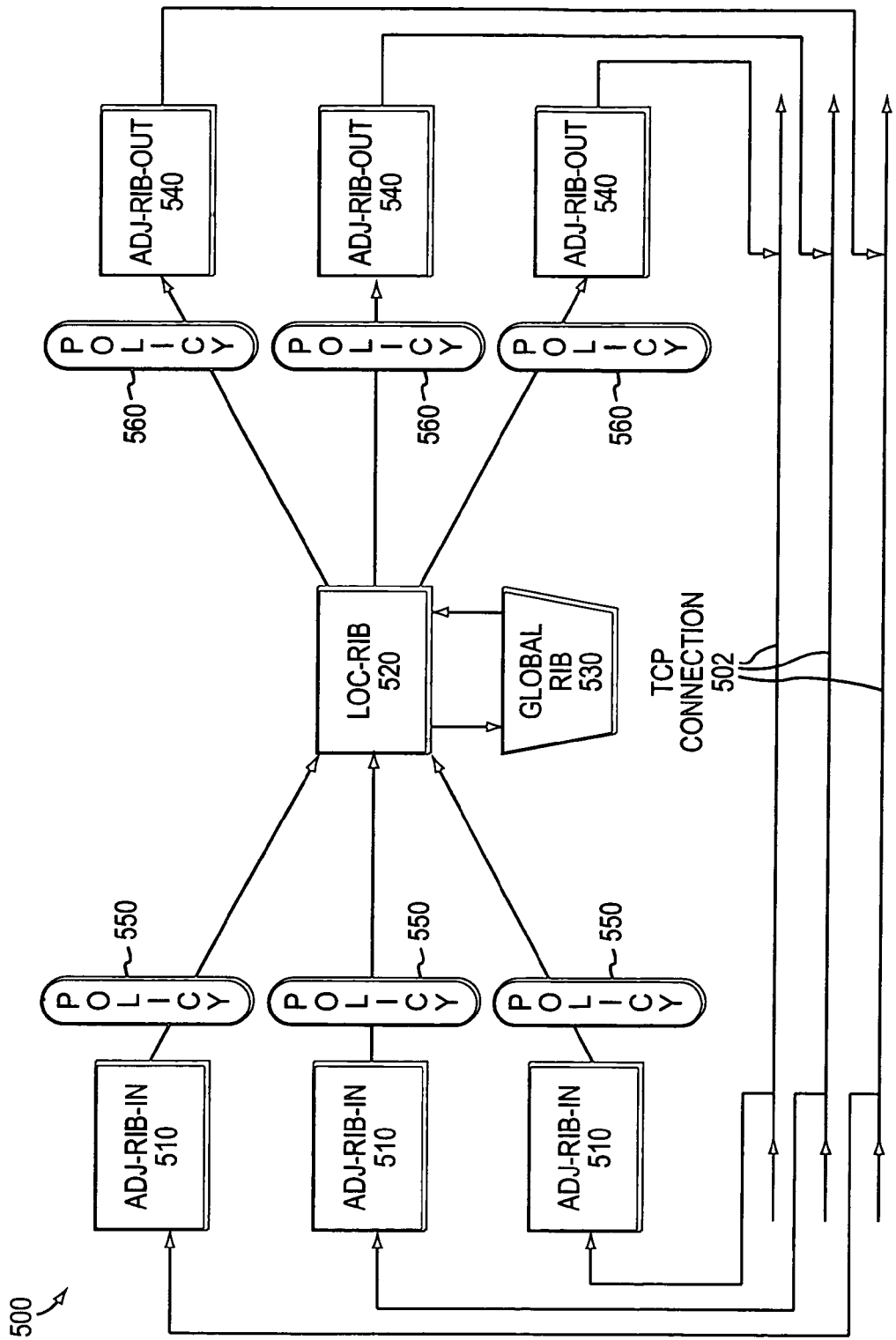
FIG. 5 is a schematic block diagram illustrating the architecture of the BGP protocol.

FIG. 5 is a schematic block diagram illustrating the architecture of the BGP protocol 500 executing on router 300. Peers announce routing updates via TCP connections 502. The BGP protocol "listens" for routing update messages and stores all learned routes for each connection in a BGP database. The BGP database is illustratively organized as Adjacency RIB In (Adj-RIB-In 510), Adjacency RIB Out (Adj-RIB-Out 540) and local RIB (loc-RIB 520). Each peer/TCP connection 502 is associated with an Adj-RIB-In 510 and an Adj-RIB-Out 540. The BGP protocol runs inbound policy on all routes "learned" for each connection 502 and those routes that match are stored in an Adj-RIB-In 510 unique to that connection. Additional inbound policy 550 (filtering) is then applied to those stored routes, with a potentially modified route being installed in the loc-RIB 520.

The loc-RIB 520 stores routes that are similar to the routes in the forwarding table; to that end, the loc-RIB 520 is generally responsible for selecting the best route per prefix from the union of all policy-modified Adj-RIB-In routes, resulting in routes referred to as "best paths". The set of best paths is then installed in the global RIB 530, where those paths may contend with best paths from other protocols to become the "optimal" path ultimately selected for forwarding. A BGP Routing Information Base (bRIB) process maintains the loc-RIB 520, including processing and downloading the best path to the global RIB 530. The global RIB 530 illustratively maintains the routing table for the router. Note that the routing table typically denotes a database containing all available routes, including ones that have been selected for forwarding (optimal paths) as well as, in some cases, backup routes that are not currently selected for forwarding. In contrast, the forwarding table denotes those optimal best paths that have actually been selected for forwarding. Thereafter, the set of best paths has outbound policy 560 run on it, the result of which is placed in appropriate Adj-RIB-Outs 540 and announced to the respective peers via the same TCP connections 502 from which routing update messages were learned.

Referring further to FIG. 3, the memory is provided with a local store 340 of BGP routes (prefixes) that is built from the above-described update process in which routes are received from all BGP peers, and then best path computations are run thereon. In one embodiment, this store 340 can be placed upon a non-volatile memory space (represented by dashed line 370) within the router's memory space 304, which allows the information to survive a failure of the router and/or power source. This arrangement (with a non-volatile area on the primary board 303) is sufficient to maintain the bRIB where the primary board has not failed. For example, the bRIB will be maintained in the event of a restart of BGP. Where the primary board 303 has failed an optional, redundant or "standby" board 350 is employed.

In this further embodiment, the bus 305, or another connectivity within the router 300, interconnects to the redundant standby board 350 that is provided with its own power source or a non-volatile memory 360 that includes a copy of a bRIB store 362. Notably, the bRIB store 362 stores the group best path of all BGP speaker processes. Conversely, the store 362 can act as a "hot standby" for the router 300, which stores all the best paths normally in the router memory 304. In any case, the store 362 allows BGP routing information that existed prior to a failure to be retrieved immediately upon restart without awaiting receipt of updates from peers. Note that the store 362 contains current routing information because it is updated by the processor 302 as its own internal best path information is updated using a mirroring approach (or the like).

The standby board 350 may include its own standby processor 364 for controlling memory and communicating with the router 300. It may also execute a failover process 366 that loads the store 362 into router memory 304 when needed at restart. In general, the standby processor 364 functions to provide the same BGP route processing functions as the primary board's route processor 302 in the event of the failure of the primary board 303. It communicates directly with appropriate network interfaces to allow continued operation of BGP. As such, the bRIB on the standby board 350 is maintained and acts as the local store 340 in the event of failure. In this example, where the primary board 303 has not failed (for example, where the BGP process is merely restarting), the bRIB continues to be maintained in a non-volatile memory (represented by dashed line 370) on the primary board 303 that is associated with the local store 340. In the case of a non-failure, the primary board's route processor 302 maintains control over BGP using the non-volatile local store 340.

Note, it is expressly contemplated that any of the following options can be employed in accordance with this invention: (a) a non-volatile area may be provided to the primary board with no standby board so that the bRIB can, at a minimum survive board restart; (b) a standby board with appropriate mechanisms for maintaining the standby bRIB (a mirror of the current local bRIB) can be provided an used in all cases to maintain the bRIB in the event of restart, failure, etc.; or (c) a standby board and a non-volatile local store can be provided and used in appropriate circumstances (standby board for primary failure and local non-volatile store for restart).

Figure 6:
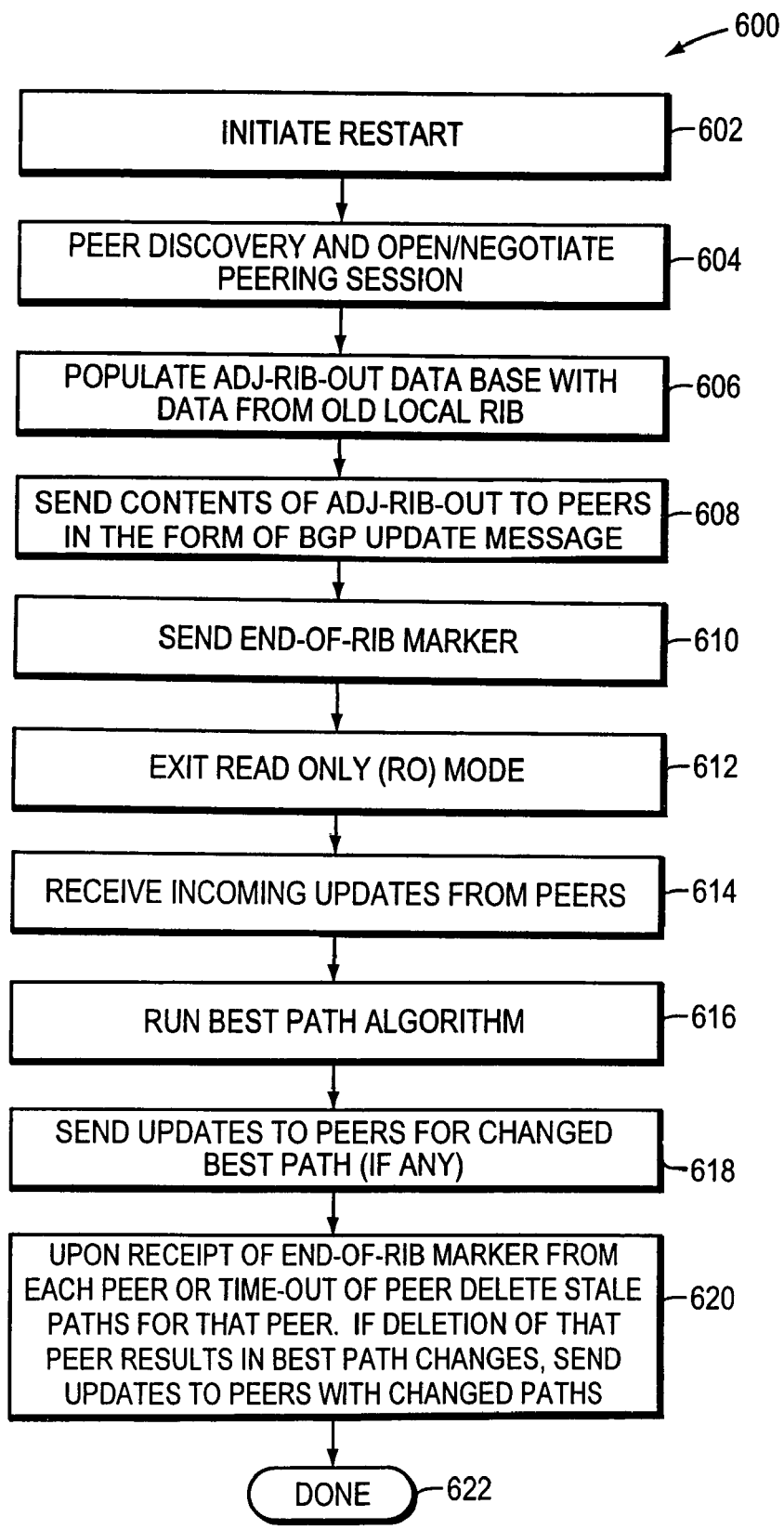
FIG. 6 is a flow diagram illustrating a procedure for implementing a graceful restart of a BGP peer in accordance with an illustrative embodiment of the invention.

To speed up the restart process, and thus avoid the potential for a timeout condition while the restarting router awaits receipt of all updates to thereby compute best paths, the procedure 600 of FIG. 6 is employed. This procedure presupposes that the BGP peer group or group of peers, including the restarting router have previously negotiated a capabilities exchange that includes the illustrative graceful restart procedure. Notably, BGP does not require acknowledgments of received messages, and, as will be clear to those of skill in the art, this is employed to implement the following procedure.

First, restart BGP occurs in 602 with the procedure in read only (RO) mode. The restart may be the result of a power-up, reset or other event that temporarily broke connection with BGP peers. In one example, the restart can involve the running of a "hot standby" process and the triggering of a "go active" signal that connects a dependent process. Other peers will discover that the router is restarting through conventional approaches. In step 604, peer discovery occurs and a peering session is opened and negotiated between the restarting peer and the discovered peers. Thereafter, the restarting peer populates its Adj-RIB-Out database with data from the old local RIB in step 606. This is possible because the old bRIB has been maintained, either on the primary board or on the standby board. By repopulating with the old RIB data, the peer avoids completing the long, involved update process before sending its end-of-RIB marker.

In step 608, the procedure then directs that the contents of the Adj-RIB-Out database be sent to peers in the form of a BGP update message. The restarting peer now sends an End-of-RIB marker to peers in step 610. The procedure then exits read only (RO) mode in step 612.

Note that the end-of-RIB marker is sent very early in the restart process, speeding restart and avoiding the possibility of timeout in reestablishment of the connection. Since the downtime before restart is likely to be very small, it is unlikely that the updates will contain much new data, thus it is generally safe to send the end-of-RIB in advance of update completion.

According to the procedure 600, the restarting peer now receives incoming updates from peers in step 614. Based upon these updates, the restarting peer runs the best path algorithm in step 616. Thereafter, appropriate adjustments to best path are made. The procedure reviews the updates from each peer and determines whether any of its own best paths information has changed. If, so then updates are sent to the peers including the changes (step 618). Thereafter, the restarting peer awaits receipt of an end-of-RIB message from each peer, indicating that the peer has sent all information, and deletes any stale best path information in its memory that is no longer applicable, as well as any timed-out peers. If the deletion of that peer results in best path changes, then the procedure sends updates to peers with such changed paths (step 620). At this point BGP convergence has occurred and the procedure 600 is complete (step 622).

The above-described approach effectively halves convergence time over prior approaches. It thus allows the system to address changes in routing topology more quickly and thereby better avoids "black holes."

The foregoing description has been directed to specific embodiments of this invention. It will be apparent; however, that other variations and modifications may be to made to the described embodiments, with the attainment of some or all of their advantages. For instance, it is expressly contemplated that the teachings of this invention, including the various processes and modules described herein, can be implemented as software, including a computer-readable medium having program instructions executing on a computer, hardware, firmware, or a combination thereof. In addition, it is understood that the data structures described herein can include additional information while remaining within the scope of the present invention. Furthermore, the inventive technique may apply generally to other routing protocols such as, e.g., IGRP, EIGRP, RIP, or other unicast, multicast routing or signaling protocols. Accordingly this description is to be taken only by way of example and not to otherwise limit the scope of the invention. Therefore, it is the object of the appended claims to cover all such variations and modifications as come within the true spirit and scope of the invention.

What is claimed is:

1. A network router adapted to gracefully restart in a network, composed of a plurality of autonomous systems, comprising:
   a processor having a memory that includes route prefix information;
   a local store of non-volatile route prefix information placed in a non-volatile memory so as to survive failure of the memory that includes the route prefix information; and
   a restart process, for execution by the processor, that (1) after initiating a restart, retrieves the non-volatile route prefix information from the non-volatile memory, (2) transmits update messages to known peers to communicate best paths, (3) generates a best path computation from the non-volatile route prefix information, (4) prior to completion of processing of updates of network information from peers, transmits an end-of-Routing Information Base (RIB) marker to known peers, and (5) after transmitting the update messages and end-of-RIB marker, processes received updates of network information from peers.

2. The network router as set forth in claim 1 wherein the route prefix information comprises Border Gateway Protocol (BGP) route prefix information, the update messages comprise BGP update messages and the processor comprises a route processor and the peers comprise BGP peers.

3. The network router as set forth in claim 2 wherein the local store is located on a standby board interconnected with the route processor and including a standby board processor.

4. The network router as set forth in claim 2 wherein the restart process transmits updates to BGP peers having changes in the best path computation.

5. The network router as set forth in claim 4 wherein the restart process deletes stale routes that are not contained in the processed received updates of network information from the BGP peers and removes reference to BGP peers that have not transmitted end-of-RIB messages in a predetermined time limit.

6. A computer-implemented method for gracefully restarting a router in a network, composed of a plurality of autonomous systems, that includes route prefixes on peers comprising the steps of:
 after initiating a restart, retrieving from a non-volatile memory route prefix information, the non-volatile memory retaining a current list of route prefix information used by the router prior to restart;
 generating a best path computation from the non-volatile memory route prefix information;
 prior to completing processing of updates of network information from peers, transmitting update messages from the router to known peers to communicate best paths;
 transmitting an end-of-Routing Information Base (RIB) marker to known peers after the step of generating the best path computation; and
 after the steps of transmitting update the messages and transmitting the end-of-RIB marker, processing received updates of network information from peers.

7. The method as set forth in claim 6 wherein the route prefix information comprises Border Gateway Protocol (BGP) route prefix information, the update messages comprise BGP update messages and the peers comprise BGP peers.

8. The method as set forth in claim 7 further comprising transmitting updates to BGP peers having changes in the best path computation.

9. The method as set forth in claim 8 further comprising deleting stale routes that are not contained in the processed received updates of network information from the BGP peers and removing reference to BGP peers that have not transmitted end-of-RIB messages in a predetermined time limit.

10. The method as set forth in claim 6 wherein the retrieving retrieves the route prefix information from a local store and the method further comprises locating the local store on a standby board and including a standby board processor.

11. A computer-readable medium including program instructions for gracefully restarting a router in a network, composed of a plurality of autonomous systems, that includes route prefixes on peers, the program instructions performing the steps of:
 after initiating a restart, retrieving from a non-volatile memory route prefix information, the non-volatile memory retaining a current list of route prefix information used by the router prior to restart;
 generating a best path computation from the non-volatile memory route prefix information;
 prior to completing processing of received updates of network information from remote peers, transmitting update messages from the router to known peers to communicate best paths;
 transmitting an end-of-Routing Information Base (RIB) marker to known peers after the step of generating the best path computation; and
 after the steps of transmitting the update messages and transmitting the end-of-RIB marker, processing received updates of network information from peers.

12. The computer-readable medium as set forth in claim 11 wherein the route prefix information comprises Border Gateway Protocol (BGP) route prefix information, the update messages comprise BGP update messages and the peers comprise BGP peers.

13. The computer-readable medium as set forth in claim 12 wherein the program instructions further perform transmitting updates to BGP peers having changes in the best path computation.

14. The computer-readable medium as set forth in claim 13 wherein the program instructions further perform deleting stale routes that are not contained in the processed received updates of routing information from the BGP peers and removing reference to BGP peers that have not transmitted end-of-RIB messages in a predetermined time limit.

15. The computer-readable medium as set forth in claim 11 wherein the retrieving retrieves the route prefix information from a local store and the program instructions further perform locating the local store on a standby board interconnected with the route processor and including a standby board processor.

16. A method comprising:
 initiating a restart of a routing protocol process in a router in response to a failure;
 after initiating the restart, retrieving route prefix information from a local store that retains a copy of route prefix information that was received from remote peers prior to the restart;
 performing a best path computation using the retrieved route prefix information;
 prior to completing processing of any received updates of network information from remote peers, transmitting update messages to known remote peers to communicate best paths and transmitting an end-of-Routing Information Base (RIB) marker to known remote peers; and
 after transmitting update messages to known remote peers and transmitting the end-of-RIB marker to known remote peers, completing processing of any received updates of network information from remote peers.

17. The method as set forth in claim 16 wherein the local store is maintained in a non-volatile memory on a primary board of the router.

18. The method as set forth in claim 16 wherein the local store is maintained in a memory on a standby board of the router.

19. The method as set forth in claim 16 wherein the route prefix information comprises Border Gateway Protocol (BGP) route prefix information, the update messages comprise BGP update messages and the peers comprise BGP peers.

20. The method as set forth in claim 16 further comprising:
 in response to processing at least some received updates of network information from remote peers, deleting stale routes and removing reference to remote peers that have not transmitted end-of-RIB messages in a predetermined time limit.

21. The method as set forth in claim 16 further comprising:
 after transmitting update messages to known remote peers and transmitting the end-of-RIB marker to known remote peers, receiving at least some updates of network information from remote peers.

* * * * *

UNITED STATES PATENT AND TRADEMARK OFFICE
CERTIFICATE OF CORRECTION

PATENT NO. : 7,710,899 B1
APPLICATION NO. : 11/205977
DATED : May 4, 2010
INVENTOR(S) : David D. Ward It is certified that error appears in the above-identified patent and that said Letters Patent is hereby corrected as shown below:

Col. 2, Line 12, please amend as shown:

performed; however, BGP peer routers residing in the [[as]] ASs

Col. 2, Line 23, please amend as shown:

messages for an adjacency, [[to]] also known as a peer router, by

Col. 2, Line 28, please amend as shown:

update messages allows BGP routers of the [[as]] ASs to construct a

Col. 4, Line 55, please amend as shown:

the [[is]] Transmission Control Protocol/Internet Protocol (TCP/

Col. 5, Line 35, please amend as shown:

erally referred to as "data[[-]]grams" in an Internet environ-

Col. 5, Line 61, please amend as shown:

the FIB 30 by the route processor 302 when [[perm forming]] performing

Col. 8, Line 17, please amend as shown:

that other variations and modifications may be [[to]] made to the

Signed and Sealed this

Twenty-seventh Day of July, 2010

David J. Kappos
*Director of the United States Patent and Trademark Office*